(12) United States Patent
Zhu et al.

(10) Patent No.: US 11,399,507 B2
(45) Date of Patent: Aug. 2, 2022

(54) PET CARE TOOL

(71) Applicant: SUZHOU PETMATE INDUSTRY & TRADE CO., LTD., Suzhou (CN)

(72) Inventors: Haiyuan Zhu, Suzhou (CN); Xinggen Huang, Suzhou (CN)

(73) Assignee: SUZHOU PETMATE INDUSTRY & TRADE CO., LTD., Suzhou (CN)

( * ) Notice: Subject to any disclaimer, the term of this patent is extended or adjusted under 35 U.S.C. 154(b) by 680 days.

(21) Appl. No.: 16/359,261

(22) Filed: Mar. 20, 2019

(65) Prior Publication Data

US 2019/0335710 A1   Nov. 7, 2019

(30) Foreign Application Priority Data

May 4, 2018  (CN) .......................... 201810418869.6

(51) Int. Cl.
*A01K 13/00*   (2006.01)
*A46B 5/02*   (2006.01)
*B26B 19/24*   (2006.01)

(52) U.S. Cl.
CPC .............. *A01K 13/002* (2013.01); *A46B 5/02* (2013.01); *A01K 13/001* (2013.01); *B26B 19/24* (2013.01)

(58) Field of Classification Search
CPC ...... A01K 13/002; A01K 13/001; A46B 5/02; A46B 5/0079; A46B 5/0083; B26B 19/24
See application file for complete search history.

(56) References Cited

U.S. PATENT DOCUMENTS

| 5,123,768 A | * | 6/1992 | Franklin | .............. A46B 5/0075 403/84 |
| 2009/0144921 A1 | * | 6/2009 | Newsome | .............. A46B 5/023 15/143.1 |

\* cited by examiner

*Primary Examiner* — Timothy D Collins
*Assistant Examiner* — Maria E Graber
(74) *Attorney, Agent, or Firm* — SZDC Law P.C.

(57) ABSTRACT

A pet care tool includes a work head and a handle connected to the work head; wherein the handle is pivotally connected to the work head by a pivotal connection mechanism, which comprises an angle locking structure that can lock and unlock the connection angle of the work head and the handle in at least two angular positions. An object of the present invention is to provide a pet care tool capable of adjusting the connection angle of the work head and the handle, so as to enable the pet care tool to be applied to various applications and optimize the care effect.

8 Claims, 4 Drawing Sheets

PET CARE TOOL

CROSS-REFERENCE TO RELATED PATENT APPLICATIONS

This application claims the priority benefit of China Patent Application No. 201810418869.6, filed on May 4, 2018, and entitled "Pet care tool" which is incorporated by reference in its entirety.

TECHNICAL FIELD

The present invention relates to the field of pet care products, and in particular to a pet care tool.

BACKGROUND

For the modern life, it is quite popular to promote the fun of living by keeping pets. Many people who keep pets know that cats and dogs have to change their hair in spring and autumn, when there will be a lot of hair loss. A large amount of hair that has fallen off will adhere to various objects and people in the room, affecting indoor hygiene, and affecting digestion if eaten by mistake. Therefore, it is necessary to regularly comb or trim the pet hair, so that not only the lost hair dirt and dust can be removed and the hair can be prevented from tangling, but also blood circulation can be promoted such that the skin resistance is enhanced and fatigue is relieved.

The work head and the handle of existing pet care tools, especially a pet comb, are completely fixedly connected. This makes the connection angle of the two unadjustable, such that the direction of the comb teeth on the work head is unchangeable. However, each pet has different characteristics of hair distribution in different body parts. When the user combs the pet hair with a traditional pet comb, it is necessary for the user to constantly change the angle of the force or change the way of holding the comb, so as to make the comb teeth as close as possible to the skin of different parts of the pet to get the hair combed. However, such a method will make the user more laborious due to the angle of the applied force during use, thereby affecting the combing effect. In addition, the connection angle of the work head and the handle is not adjustable, and the work head and the handle cannot be closed together by rotation, making the pet care tool inconvenient to be stored and packaged.

SUMMARY

In view of the above problems, an object of the present invention is to provide a pet care tool capable of adjusting the connection angle of the work head and the handle, so as to enable the pet care tool to be applied to various applications and optimize the care effect.

A technical solution of the present invention is as follows:

A pet comb is provided, comprising:

a work head with comb teeth, and a handle;

the handle is pivotally connected to the work head by a pivotal connection mechanism, which comprises an angle locking structure that can lock and unlock the connection angle of the work head and the handle in at least two angular positions.

The present invention further includes the following preferred solutions on the basis of the above technical solution:

The angle locking structure comprises:

a plurality of first engaging teeth fixed to the work head and spaced apart in the circumferential direction, a plurality of second engaging teeth fixed to the handle and spaced apart in the circumferential direction, a ring gear adapted to the first and second engaging teeth, and a ring gear drive assembly that drives the ring gear to move so as to be selectively in a first position or a second position;

when the ring gear is in the first position, the first and second engaging teeth simultaneously mesh with the ring gear; when the ring gear is in the second position, the first engaging teeth mesh with the ring gear while the second engaging teeth are separated from the ring gear.

With the handle comprising two spaced work head connection ends, the pivotal connection mechanism comprises:

two circular grooves disposed in the work head one in the left and one in the right, with their opening directions away from each other; the circular groove is provided on the circular groove wall with a plurality of axially extending linear inner teeth, which are spaced apart in the circumferential direction of the circular groove wall of the circular groove;

two pin shafts respectively coaxially disposed in the two circular grooves;

two outer ring gears respectively projecting into the two circular grooves and respectively movably sleeved outside the two pin shafts, the outer ring gear comprising: a circular ring body, a plurality of linear outer teeth fixed on the periphery of the ring body and extending along the axial direction of the ring body, and a limit inner flange fixed at an axially outer end of an inner hole of the ring body, with the linear outer teeth spaced apart along the outer circumferential direction of the ring body;

two springs respectively sleeved outside the two pin shafts and axially clamped between the limit inner flange and the bottom wall of the circular groove;

a central hole disposed through the work head connection end;

a plurality of side holes disposed through the work head connection end and spaced apart on the periphery of the central hole;

a plurality of limit engaging teeth disposed on opposite sides of the two work head connection ends and spaced apart along the outer circumferential direction of the central hole; and two unlocking buttons respectively axially movably connected to the two work head connection ends and comprising a plurality of bosses movably disposed through the side holes.

The circular groove, the linear inner teeth and the pin shaft are all integrally formed on the work head.

The work head connection end is integrally formed on the handle.

The handle has a C-shaped structure.

The unlocking button is connected to the work head connection end by a screw.

The pin shaft is provided at the end with an axially inwardly extending screw connection hole, into which the screw is locked by sequentially going through the unlocking button and the central hole.

A decorative cover for covering the screw head of the screw is embedded in the unlocking button.

The two work head connection ends are capable of moving toward/away from each other under the action of an external force, and the limit engaging teeth extend into the circular groove.

The present invention has the following advantages:

1. The work head and the handle of the pet comb of the present invention are rotatably connected to each other by a pivotal connection mechanism with an angle locking function. In a normal state, the connection angle of the work head and the handle is locked under the elastic force of a spring. After the unlocking button is pressed, the work head and the handle are unlocked, and the connection angle between the work head and the handle can be freely adjusted. Once the unlocking button is released after a desired angular position is achieved through the adjustment, the spring re-locks the work head and the handle at another connection angle, with the whole process very convenient.

2. The handle has a C-shaped structure, and the work head can be flipped inside the handle, thus reducing the occupation space of the care tool and facilitating package and storage.

BRIEF DESCRIPTION OF DRAWINGS

The present invention will be further described below with reference to drawings and examples.

Wherein: 1 a work head; 101 a circular groove; 102 a pin shaft; 103 linear inner teeth; 104 a screw connection hole; 2 a handle; 201 a work head connection end; 202 a central hole; 203 limit engaging teeth; 204 a side hole; 3 an outer ring gear; 301 a ring body; 302 linear outer teeth; 303 a limit inner flange; 4 a spring; 5 an unlocking button; 501 a boss; 6 a screw; and 8 a decorative cover.

DETAILED DESCRIPTION OF PREFERRED EMBODIMENTS

FIGS. 1 to 4 show a specific example of the pet care tool of the present invention, which is a pet comb for combing pet hair. Like the conventional pet comb, the pet care tool of the present invention also comprises a handle 2 (a comb handle) and a work head 1 (a comb head), with the work head 1 provided with a plurality of comb teeth.

A key improvement of this example is that the handle 2 is pivotally connected to the work head 1 by means of a pivotal connection mechanism, so that the connection angle of the two is adjustable to suit different usage environments. The aforementioned pivotal connection mechanism comprises an angle locking structure that can lock and unlock the connection angle of the work head 1 and the handle 2 in a plurality of angular positions.

The angle locking structure comprises: a plurality of first engaging teeth fixed to the work head 1 and spaced apart in the circumferential direction, a plurality of second engaging teeth fixed to the handle 2 and spaced apart in the circumferential direction, a ring gear adapted to the first and second engaging teeth, and a ring gear drive assembly that drives the ring gear to move so as to be selectively in a first position or a second position.

When the ring gear is in the first position, the first and second engaging teeth simultaneously mesh with the ring gear, thereby locking the connection angle of the work head 1 and the handle 2 to make the work head 1 and the handle 2 unable to rotate relative to each other. When the ring gear is in the second position, the first engaging teeth mesh with the ring gear while the second engaging teeth are separated from the ring gear, making the work head 1 and the handle 2 relatively rotatable.

The handle 2, having a substantially C-shaped structure, comprises two spaced work head connection ends 201. The handle 2 is made of a plastic material, so that it has a certain deformability. When an external force is applied to the handle 2, the two work head connection ends 201 are capable of moving toward/away from each other.

The handle 2 has a C-shaped structure, and the work head 1 can be flipped inside the handle 2 (to get the tool closed), thus reducing the occupation space of the care tool and facilitating package and storage.

Figure 1:
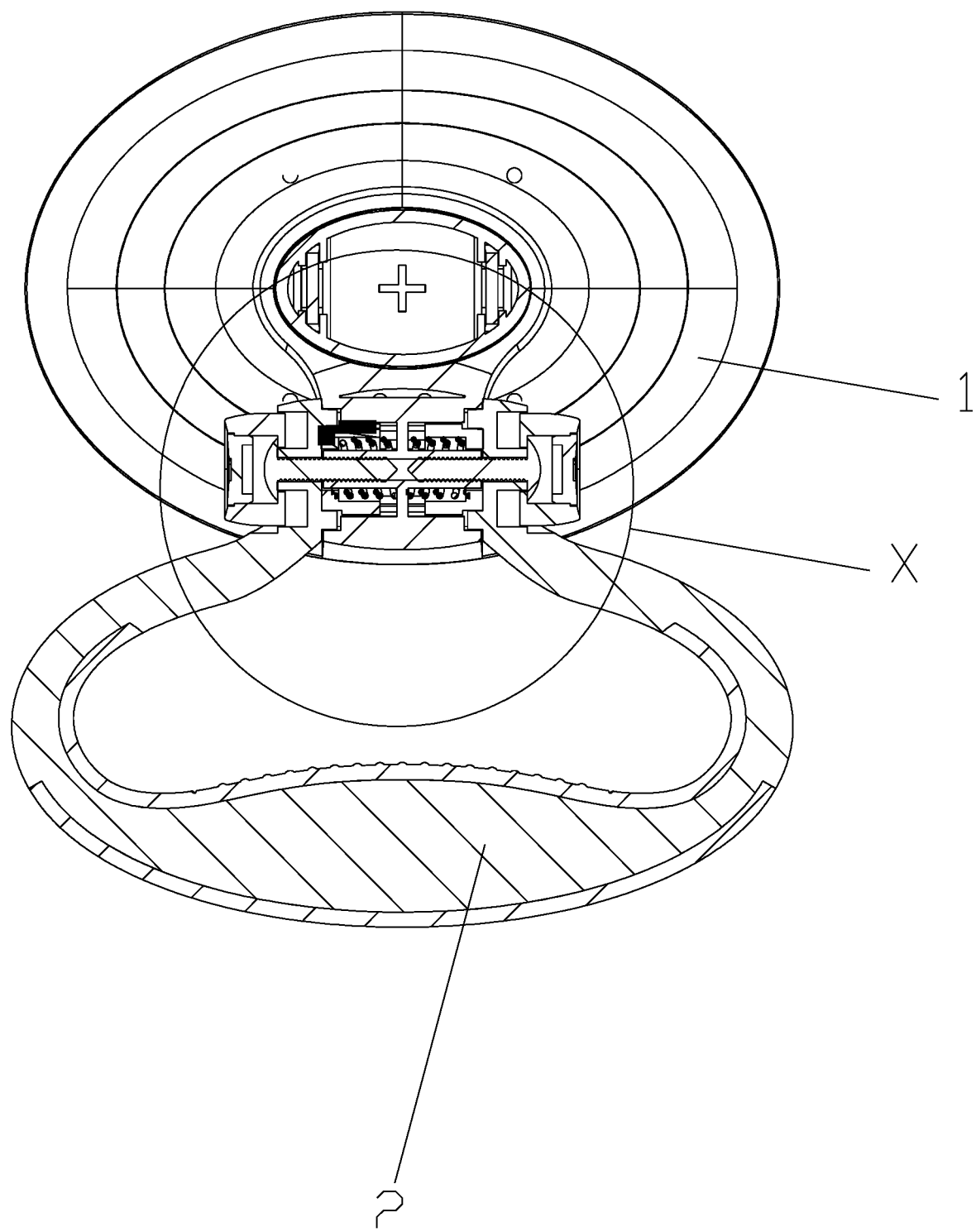
FIG. 1 is a schematic view (with a partial cross-sectional view) showing the overall structure of a pet comb in an example of the present invention.
Figure 2:
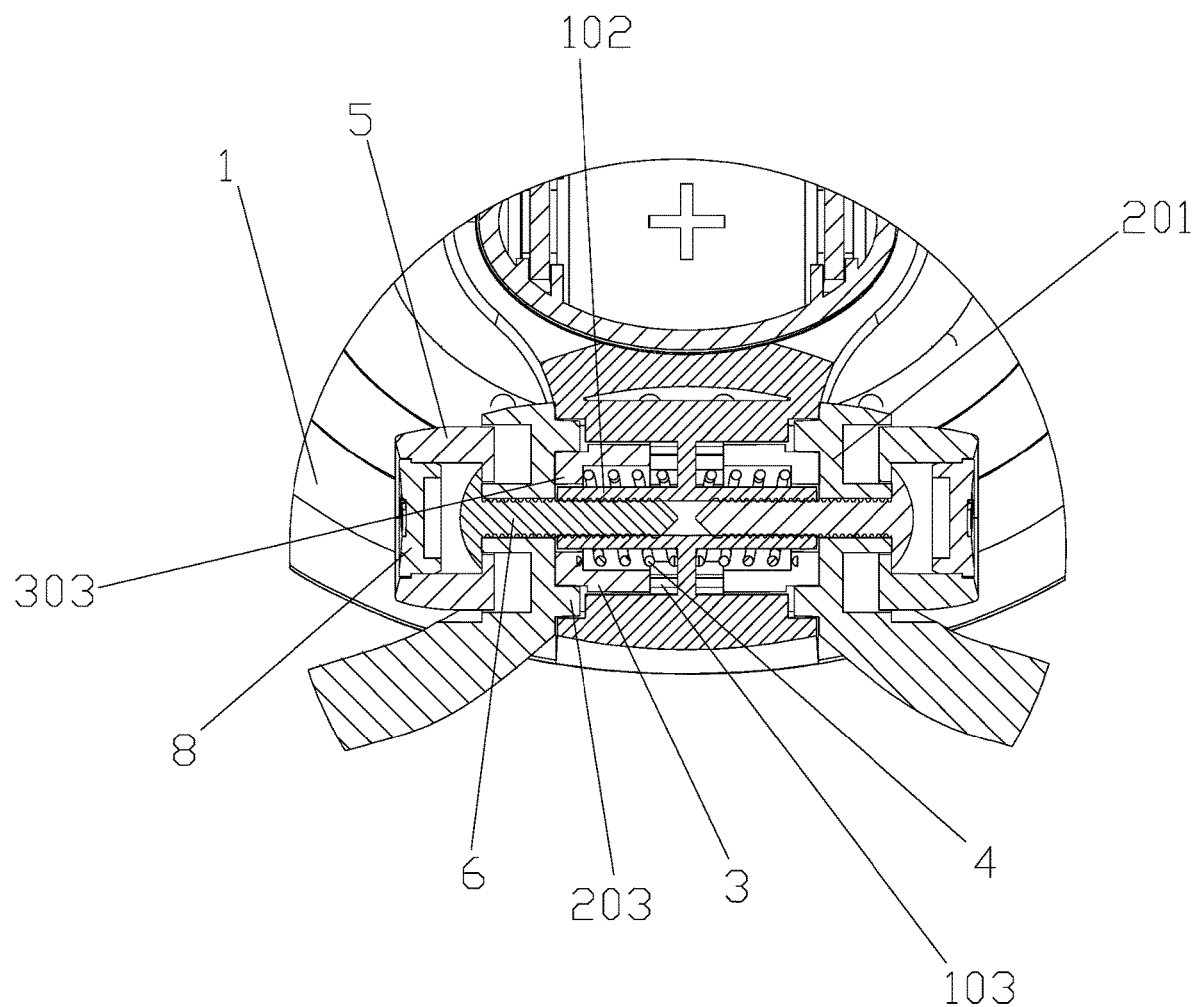
FIG. 2 is an enlarged view of the portion X in FIG. 1.
Figure 3:
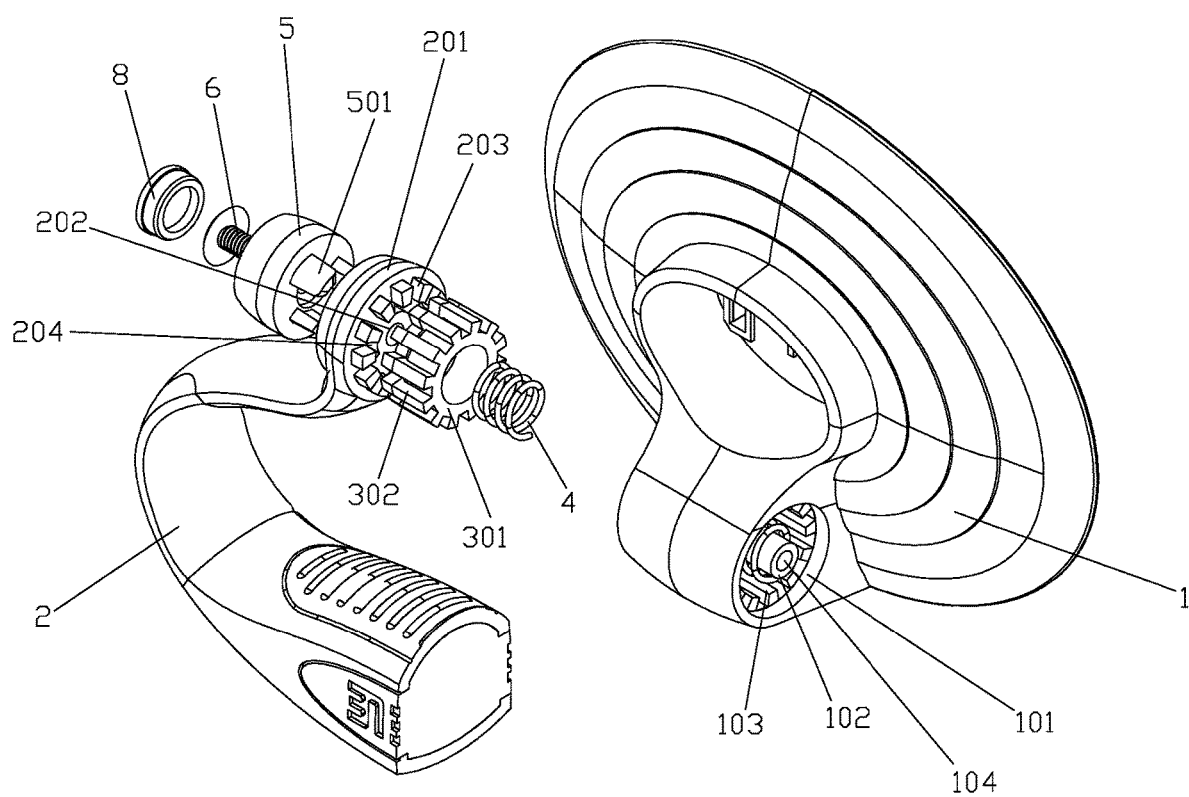
FIG. 3 is an exploded perspective view of the pet comb in the example of the present invention.
Figure 4:
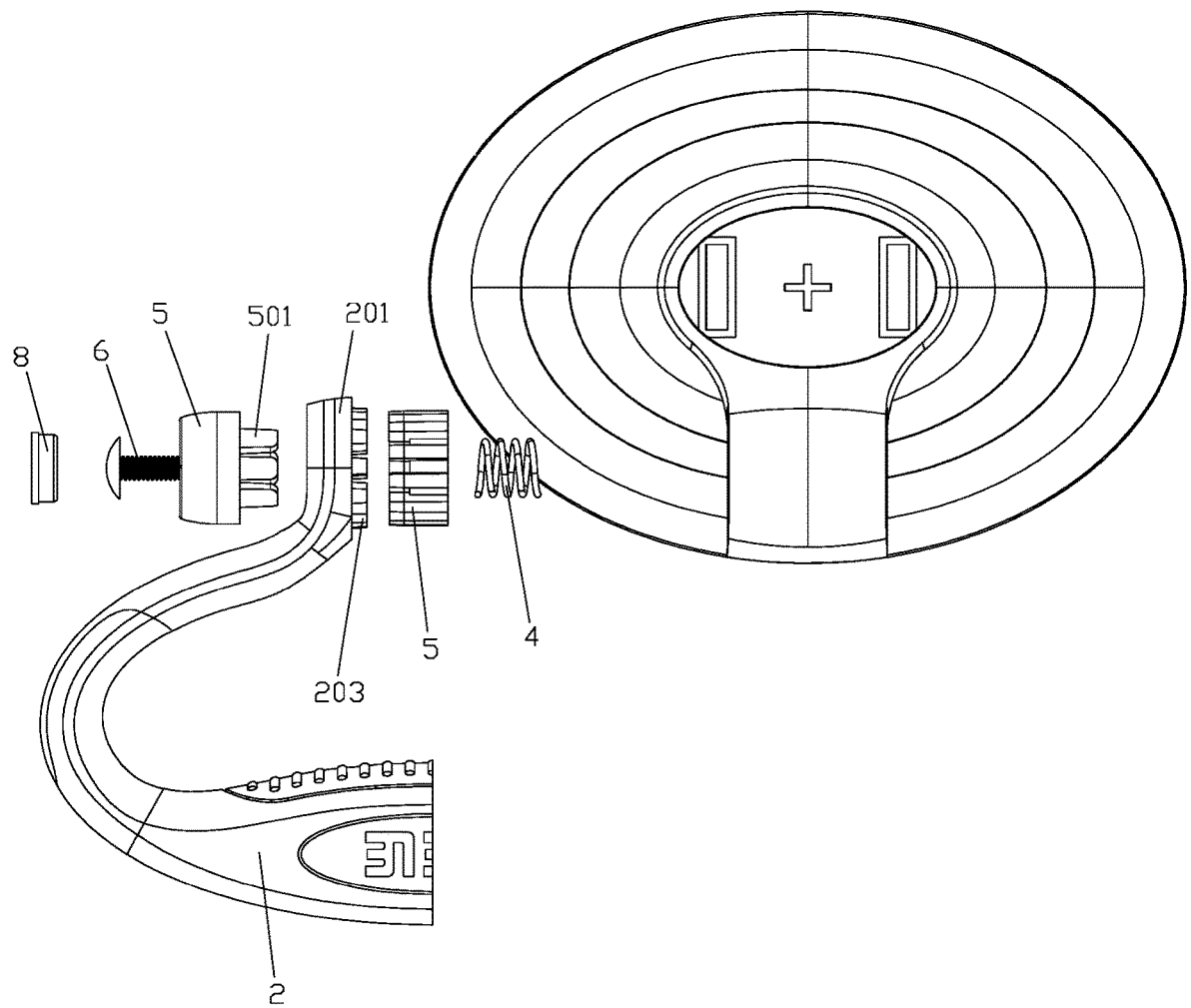
FIG. 4 is an exploded view showing the planar structure of the pet comb in the example of the present invention.

More specifically, with reference to FIG. 1, the above pivotal connection mechanism comprises: two circular grooves 101 integrally formed on the work head 1, two pin shafts 102 respectively coaxially disposed in the two circular grooves 101, a central hole 201 disposed through the work head connection end 202, three side holes 204 disposed through the work head connection end 201 and uniformly spaced apart on the periphery of the central hole (202), a plurality of limit engaging teeth 203 (i.e., the second engaging teeth described above) integrally formed on opposite sides of the two work head connection ends 201 and uniformly spaced apart along the outer circumferential direction of the central hole 202, two outer ring gears 3 (i.e., the ring gear described above), two springs 4, and two unlocking buttons 5. Wherein:

The two circular grooves 101 are disposed one in the left and one in the right, with their opening directions away from each other. The circular groove 101 is provided on the circular groove wall with a plurality of axially extending linear inner teeth 103 (i.e., the first engaging teeth described above), which are uniformly spaced apart in the circumferential direction of the circular groove wall of the circular groove 101.

The two outer ring gears 3 respectively project into the two circular grooves 101 and are respectively movably sleeved outside the two pin shafts 102. The outer ring gear 3 comprises a circular ring body 301, a plurality of linear outer teeth 302 integrally formed on the periphery of the ring body 301 and extending along the axial direction of the ring body 301, and a limit inner flange 303 integrally formed at an axially outer end of an inner hole of the ring body 301. The linear outer teeth 302 are uniformly spaced apart along the outer circumferential direction of the ring body 301.

The two springs 4 are respectively sleeved outside the two pin shafts 102, and axially clamped between the limit inner flange 303 and the bottom wall of the circular groove 101. The spring 4 exerts an axially outward elastic force on the outer ring gears 3, so that the two outer ring gears 3 have a tendency to move away from each other in the axial direction.

The two unlocking buttons 5 are respectively axially movably connected to the two work head connection ends 201, and comprise three bosses 501 movably disposed through the side holes 204. The unlocking button 5 is connected to the work head connection end 201 specifically by a screw 6. Specifically, the pin shaft 102 is provided at the end with an axially inwardly extending screw connection hole 104, into which the screw 6 is locked by sequentially going through the unlocking button 5 and the central hole 202. The depth of the screw 6 locked into the screw connection hole is limited, so that the size of the screw 6 outside the screw connection hole is large, making the unlocking button 5 have a certain axial displacement space. Further, a metal gasket is disposed between the screw 6 and the unlocking button 5, and a decorative cover 8 for covering the screw head of the screw 6 is embedded in the unlocking button 5.

The outer ring gear 3 and the handle 2 are respectively of an integral structure.

Normally, the outer ring gear 3, under the elastic force of the spring 4, is in the first position moved axially outward, while the linear outer teeth 302 on the outer ring gear 3 mesh simultaneously with the linear inner teeth 103 and the limit engaging teeth 203. Thereby, the connection angle of the work head 1 and the handle 2 is locked, and the work head 1 and the handle 2 cannot be rotated relative to each other.

When an operator presses the unlocking buttons 5 axially inward, the two unlocking buttons 5 axially approach each other against the elastic force of the spring, and the bosses 501 on the unlocking buttons 5 axially press the outer ring gear 3 such that the outer ring gear 3 moves axially inward to the second position, with the linear outer teeth 302 on the outer ring gear 3 disengaged from the limit engaging teeth 203 and only meshing with the linear inner teeth 103. At this time, the outer ring gear 3 no longer restricts the rotation of the handle 2, and the work head 1 and the handle 2 are relatively rotatable.

After the unlocking button 5 is released, the outer ring gear 3 is returned to the first position under the elastic force of the spring 4. The connection angle of the work head 1 and the handle 2 is locked again.

Certainly, the example described above is only intended to illustrate the technical concept and features of the present invention, with the purpose of enabling those skilled in the art to understand and implement the present invention instead of limiting the protection scope of the present invention. Any equivalent alteration or modification made according to the spiritual substance of the main technical solution of the present invention will all fall within the protection scope of the present invention.

What is claimed is:

1. A pet care tool, comprising: a work head, and a handle connected to the work head; wherein the handle is pivotally connected to the work head by a pivotal connection mechanism, which comprises an angle locking structure that can lock and unlock the connection angle of the work head and the handle in at least two angular positions, wherein the angle locking structure comprises: a plurality of linear inner teeth fixed to the work head and spaced apart in the circumferential direction, a plurality of linear outer teeth fixed to the handle and spaced apart in the circumferential direction, a ring gear adapted to the linear inner and linear outer teeth, and a ring gear drive assembly that drives the ring gear to move so as to be selectively in a first position or a second position; when the ring gear is in the first position, the linear inner and linear outer teeth simultaneously mesh with the ring gear; and when the ring gear is in the second position, the linear inner teeth mesh with the ring gear while the linear outer teeth are separated from the ring gear, and wherein with the handle comprising two spaced work head connection ends, the pivotal connection mechanism comprises: two circular grooves disposed in the work head one in the left and one in the right, with their opening directions away from each other; the circular grooves are provided on corresponding circular groove walls with the linear inner teeth extending axially, which are spaced apart in the circumferential direction of the circular groove walls; two pin shafts respectively coaxially disposed in the two circular grooves, two outer ring gears respectively projecting into the two circular grooves and respectively movably sleeved outside the two pin shafts, the outer ring gears comprising: a circular ring body, the linear outer teeth fixed on the periphery of the circular ring body and extending along the axial direction of the circular ring body, and a limit inner flange fixed at an axially outer end of an inner hole of the circular ring body, with the linear outer teeth spaced apart along the outer circumferential direction of the circular ring body; two springs respectively sleeved outside the two pin shafts and axially clamped between the limit inner flange and the bottom wall of the circular grooves; central holes disposed through the work head connection ends; a plurality of side holes disposed through each of the work head connection ends and spaced apart on the periphery of each of the central holes; a plurality of limit engaging teeth disposed on opposite sides of the two work head connection ends and spaced apart along the outer circumferential direction of the central holes; and two unlocking buttons respectively axially movably connected to the two work head connection ends and comprising a plurality of bosses movably disposed through the side holes.

2. The pet care tool according to claim 1, wherein the circular grooves, the linear inner teeth and the pin shafts are all integrally formed on the work head.

3. The pet care tool according to claim 1, wherein the work head connection ends are integrally formed on the handle.

4. The pet care tool according to claim 1, wherein the handle has a C-shaped structure.

5. The pet care tool according to claim 1, wherein the unlocking buttons are connected to the work head connection ends by screws.

6. The pet care tool according to claim 1, wherein the two work head connection ends are capable of moving toward or away from each other under the action of an external force, and the limit engaging teeth extend into the circular grooves.

7. The pet care tool according to claim 5, wherein the pin shafts are provided at the ends thereof with axially inwardly extending screw connection holes, into which the screws are locked by sequentially going through the unlocking buttons and the central holes.

8. The pet care tool according to claim 7, wherein a decorative cover for covering a screw head of each of the screws is embedded in each of the unlocking buttons.

\* \* \* \* \*